United States Patent
Utsunomiya et al.

(10) Patent No.: US 7,536,077 B2
(45) Date of Patent: May 19, 2009

(54) METHOD FOR SENDING INFORMATION ON A NETWORK, AND ELECTRONIC INFORMATION EQUIPMENT

(75) Inventors: Hiroshi Utsunomiya, Chiba (JP); Futoshi Kaibuki, Tokyo (JP); Satoshi Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1800 days.

(21) Appl. No.: 09/852,485

(22) Filed: May 10, 2001

(65) Prior Publication Data

US 2002/0066113 A1    May 30, 2002

(30) Foreign Application Priority Data

May 11, 2000    (JP)    ............ P2000-137954

(51) Int. Cl.
  *H04N 5/91*    (2006.01)
(52) U.S. Cl. .................. 386/46; 386/52; 386/83; 386/95
(58) Field of Classification Search ............ 386/46, 386/96, 83, 69, 95, 52
  See application file for complete search history.

(56) References Cited

U.S. PATENT DOCUMENTS 4,808,992 A * 2/1989 Beyers et al. ............ 386/96
5,796,538 A * 8/1998 Ji et al. .................... 360/69
6,311,011 B1 * 10/2001 Kuroda .................... 386/46
6,678,463 B1 * 1/2004 Pierre et al. .............. 386/83

* cited by examiner

*Primary Examiner*—Vincent F Boccio
(74) *Attorney, Agent, or Firm*—Sonnenschein Nath & Rosenthal LLP

(57) ABSTRACT

Electronic information equipment for recording contents are connected to a network. One of the pieces of electronic information equipment manages information of the dispersed storage state. The managing device gives output instructions to the other electronic information equipment storing the information in a dispersed manner such that each of the pieces of electronic information equipment outputs the information stored therein to output destination electronic information equipment, and in the event that the end of information output from one piece of electronic information equipment has been detected, the managing device gives output instructions to the electronic information equipment storing the subsequent information to output the information stored therein to the output destination electronic information equipment. Each of the pieces of electronic information equipment storing the information in a dispersed manner outputs information onto the network with the output destination electronic information equipment specified. Accordingly, the present invention enables contents recorded in a dispersed manner to be readily played in a continuous manner.

18 Claims, 14 Drawing Sheets

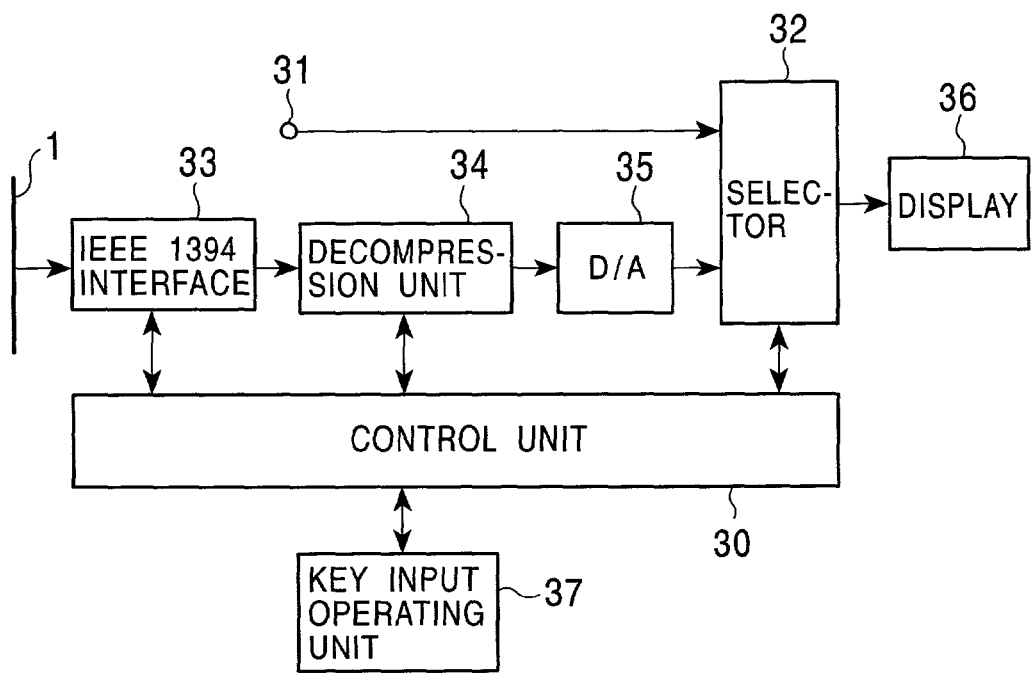
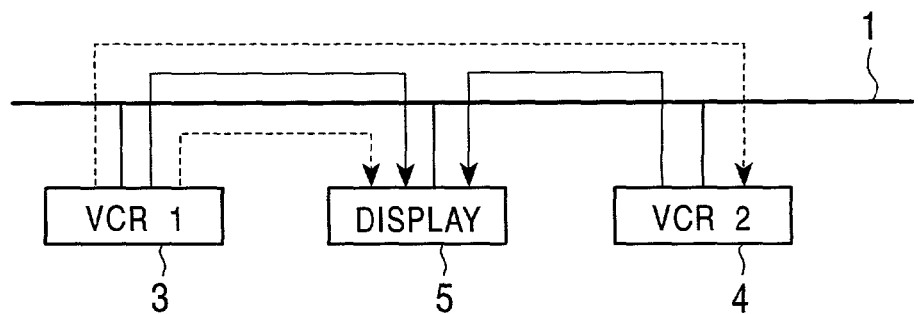

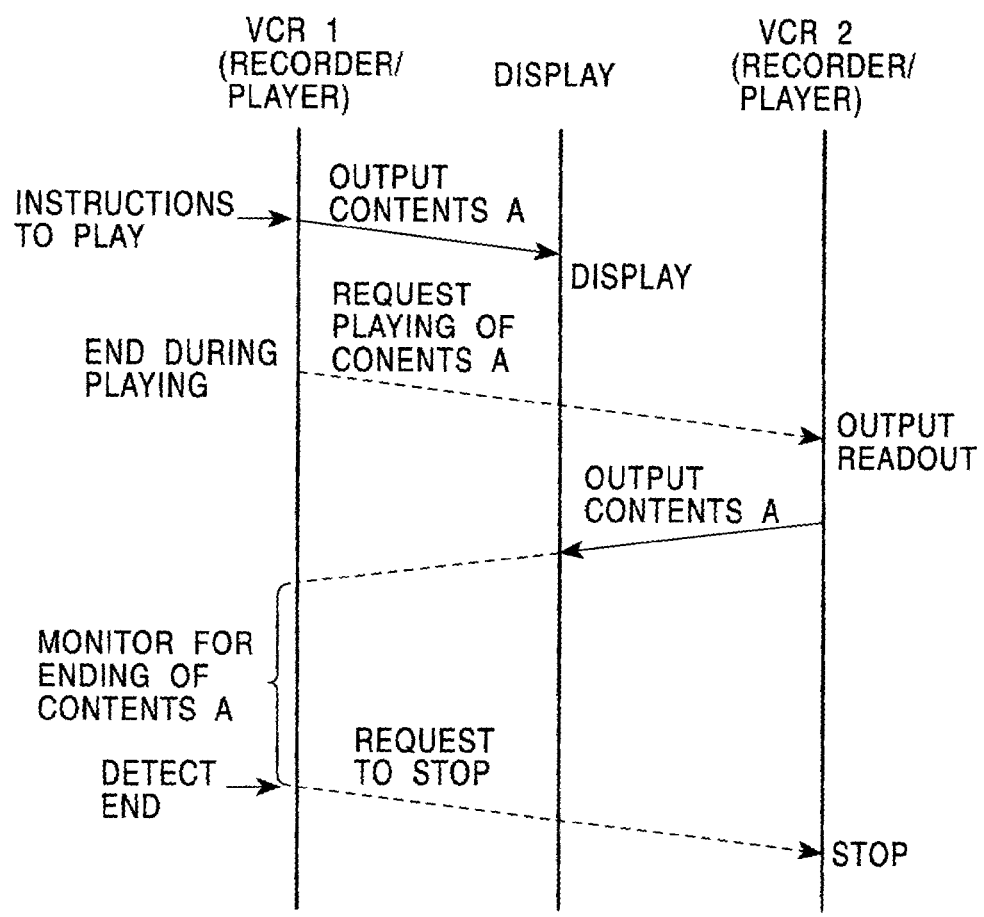

FIG. 11

| CONTENTS ID | LOCATION OF STORAGE |
|---|---|
| ID1 | VCR 1 |
| ID2 | VCR 1 ⟶ VCR 2 |
| ⋮ | ⋮ |

METHOD FOR SENDING INFORMATION ON A NETWORK, AND ELECTRONIC INFORMATION EQUIPMENT

RELATED APPLICATION DATA

The present application claims priority to Japanese Application No. P2000-137954 filed May 11, 2000, which application is incorporated herein by reference to the extent permitted by law.

BACKGROUND OF THE INVENTION

The present invention relates to a method for sending information over a network, and more specifically relates to a method for sending information over a network suitably used with arrangements wherein, for example, information such as movies, music, or broadcast programs recorded on tape or in a disk have been recorded in a dispersed state and this information is to be played, or wherein information with continuous contents is to be dispersed and recorded.

DESCRIPTION OF THE RELATED ART

In the event of recording image information and audio information such as a movie that is broadcast as a television program, for example, the information contents can only be recorded partly in the event that the recording medium such as a tape or the like does not have sufficient available capacity. In such cases, the user must record the subsequent part of the information on a separate recording medium. This means that a movie with a single title is recorded on multiple recording mediums.

In this case, if multiple pieces of electronic information equipment for recording can be prepared, the time-wise continuous information can be dispersed and recorded among multiple recording mediums in an almost seamless manner, by preparing for recording by mounting the recording medium in each piece of electronic information equipment.

Then, in the event of playing the information recorded in the multiple recording mediums in a dispersed manner, the information can be played as information almost continuous time-wise by sequentially setting multiple playing devices in the play mode, if multiple playing devices can be prepared.

However, in the event of consecutively recording time-wise continuous information with multiple pieces of recording electronic information equipment, there is the need for the user to perform remote control operation of each piece of recording electronic information equipment to carry out the recording, and this operation is extremely troublesome.

Also, in the event of consecutively playing the information dispersed and recorded in multiple recording mediums as a single block of information, the recording mediums must be mounted in multiple pieces of playing electronic information equipment and the user must sequentially give playing instructions. Also, with electronic information equipment which receives playing signals from the playing electronic information equipment and displays images on a display or plays audio, the user must switch input so that the input of information from the playing electronic information equipment currently in the play mode is selected.

Further, there is the problem that the user must recognize and manage the multiple recording mediums storing the dispersed information which is continuous time-wise.

SUMMARY OF THE INVENTION

The present invention is a method for sending information over a network wherein information is dispersed and stored in a plurality of pieces of electronic information equipment connected to the network and wherein the information stored in a dispersed state is managed by one of the pieces of electronic information equipment connected to the network; wherein each of the pieces of electronic information equipment comprises means for forming a communication channel with another piece of electronic information equipment instructed by output instructions received thereby as an interface to the network; and wherein, in the event of inputting the information stored in a dispersed state to the one of the pieces of electronic information equipment on the network as a time-wise continuous piece of information, the electronic information equipment managing the information stored in a dispersed state gives, based on managing information thereof, output instructions to each of the pieces of electronic information equipment to output the information dispersed and stored in each of the pieces of electronic information equipment to an output destination electronic information equipment, and upon detection of completion of information output from one of the pieces of electronic information equipment, gives output instructions to the electronic information equipment storing subsequent information to output the information stored therein to the output destination electronic information equipment; and wherein each of the pieces of electronic information equipment storing the information in a dispersed state output information to the network with the output destination of the information as the output destination electronic information equipment, based on the output instructions.

According to the present invention, multiple pieces of electronic information equipment are connected to the network, and one of the multiple pieces of electronic information equipment manages information of the state of dispersed storage regarding the electronic information equipment storing the dispersed information.

The electronic information equipment managing the information of this state of dispersed storage first gives output instructions to the electronic information equipment storing the first part of the dispersed and recorded information to output the information stored therein to the output destination electronic information equipment.

Next, the electronic information equipment managing the information of this state of dispersed storage detects completion of the information output from the electronic information equipment storing the first part of the dispersed and recorded information, and upon detecting that the information has ended partway through, gives output instructions to the electronic information equipment storing the information following the partway ending, to output the information stored therein to the output destination electronic information equipment. The above processing is repeated until the last part of the information recorded in a dispersed manner is output.

Thus, information dispersed and stored in multiple pieces of electronic information equipment can be continuously output without troubling the user.

Also, with the present invention, information is dispersed and stored in a plurality of pieces of electronic information equipment connected to the network and also the information stored in each of the pieces of electronic information equipment contains storing equipment information regarding which of the pieces of electronic information equipment on the network is storing the subsequent information portion; wherein each of the pieces of electronic information equipment comprises means for forming a communication channel with another piece of electronic information equipment instructed by output instructions received thereby as an interface to the network; and wherein, in the event of inputting the information stored in a dispersed state to the one of the pieces of electronic information equipment on the network as a time-wise continuous piece of information, the plurality of pieces of electronic information equipment storing the information in a dispersed state sequentially output the information stored in each of the pieces of electronic information equipment to the output destination electronic information equipment via the network; and wherein one of the pieces of electronic information equipment on the network monitors information flowing on the network, and upon detection of the storing equipment information, gives output instructions to the electronic information equipment instructed by the storing equipment information to output the information stored therein to the output destination electronic information equipment.

According to the present invention, one of the multiple pieces of electronic information equipment connected to a network manages continuous output of the dispersed and stored information. For example, in the event that the managing equipment is the electronic information equipment storing the first information part of the dispersed and stored information, output of the information stored therein is first performed, and in the event of detecting storing equipment information contained on the information output thereof on the network, output instructions are given to the electronic information equipment instructed by the storing equipment information to output to the output destination electronic information equipment.

The managing equipment constantly monitors information output on the network, and repeats the above operation to the end of the information.

Thus, information dispersed and stored in multiple pieces of electronic information equipment can be continuously output without troubling the user.

Thus, according to the present invention, contents dispersed and recorded in multiple pieces of electronic information equipment can be consecutively output from the multiple pieces of electronic information equipment. Also, the sending output destination of the contents can be readily changed, without requiring troublesome operations by the user.

BRIEF DESCRIPTION OF THE DRAWINGS

FIG. 7 is a block diagram illustrating a display serving as an embodiment of an electronic information device according to the present invention;

FIG. 8 is a diagram for describing the operation of an embodiment of the information sending method according to the present invention;

FIG. 9 is a sequence diagram for describing the operation of an embodiment of the information sending method according to the present invention;

FIG. 11 is a diagram for describing the operation of an embodiment of the information sending method according to the present invention;

DESCRIPTION OF THE PREFERRED EMBODIMENTS

Figure 1:
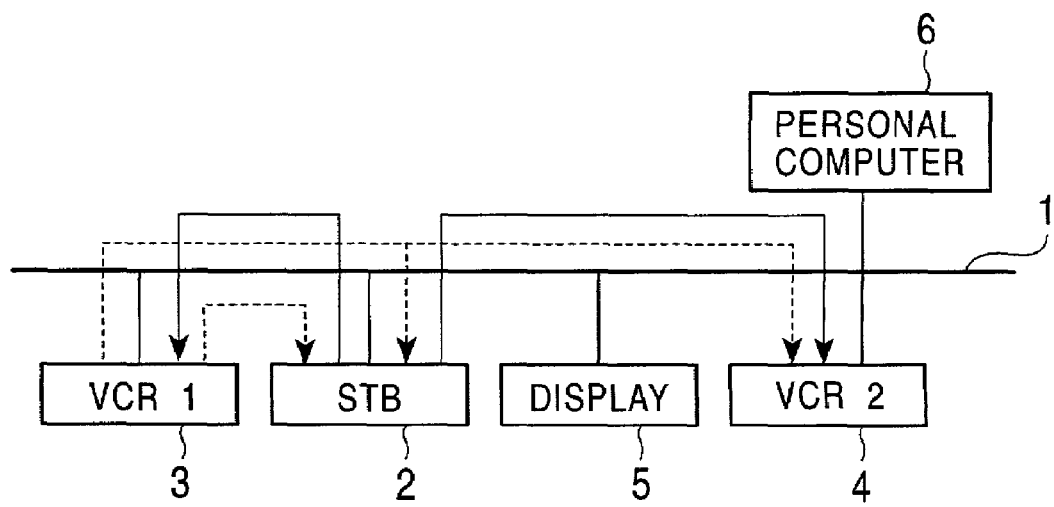
FIG. 1 is a diagram illustrating a network system to which an embodiment of the information sending method of the present invention is applied.

The following is a description of the embodiments of the method for sending information over a network according to the present invention, with reference to the drawings. In the embodiments described below, an IEEE (The Institute of Electrical and Electronic Engineers, Inc) 1934 1995 standards serial bus is used as an example of a network. Multiple electronic information devices, such as recorder/players, broadcast receivers, displays, personal computers, and the like are connected to this network.

Note that in the following description, all pictures, audio, and other data recorded in or output from the electronic information devices may be referred to as "contents".

(First Embodiment of Dispersing Method and Playing Method Thereof)

(Dispersing and Recording Method According to First Embodiment)

This first embodiment involves a case wherein a broadcast receiver (denoted by STB in the drawings) and two recorder/players (denoted by VCR in the drawings) are connected to an IEEE 1394 serial bus, and broadcast program contents received by the broadcast receiver are dispersed between and recorded by the two recorder/players.

FIG. 1 is a diagram illustrating a system configuration according to the present embodiment, wherein a broadcast receiver 2, a first recorder/player 3 (denoted by VCR 1 in the figure), a second recorder/player 4 (denoted by VCR 2 in the figure), a display 5, and a personal computer 6, are each connected to an IEEE 1394 serial bus via IEEE 1394 interfaces omitted in the figure.

The broadcast receiver 2 extracts program information selected by the user from the received broadcast signals. A program ID is contained in the extracted program information, and this is used as a contents ID. The picture information and the audio information in the program information is digital information which has been subjected to data compression by the MPEG (Moving Picture Expert Group) method, and the compressed digital information is sent out onto the bus 1 from the broadcast receiver 2 via the IEEE 1394 interface.

Though not shown in the drawing, the broadcast receiver 2 also has an analog output for the picture information and audio information, with the analog output thereof being supplied to the analog picture input terminal and the analog audio input terminal of a television receiver, so that the picture and audio of the selected program received is played by the television receiver.

Figure 3:
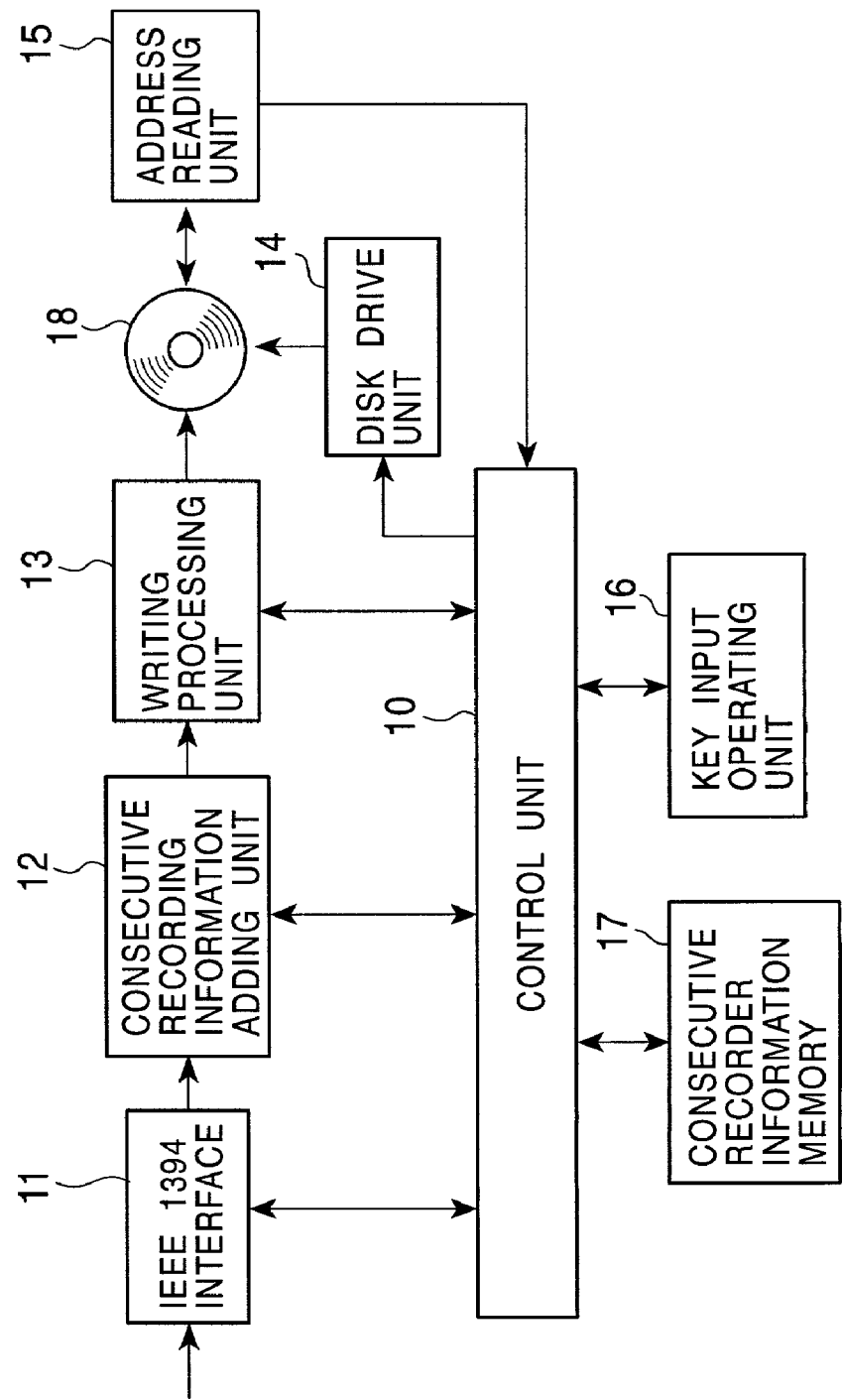
FIG. 3 is a block diagram illustrating the recording system of a recorder/player serving as an embodiment of an electronic information device according to the present invention.

The recorder/players 3 and 4 have functions for receiving the compressed digital information from the bus 1 and recording the information is a recording medium, which is a disk in this example. FIG. 3 is a block diagram illustrating a configuration example of the recording system of the recorder/player 3 or 4.

That is, the recorder/players 3 and 4 according to the present embodiment each comprises a control unit 10, an IEEE 1394 interface 11, a consecutive recording information adding unit 12, a writing processing unit 13, a drive unit 14, an address reading unit 15, a key input operating unit 16, and consecutive recorder information memory 17. The disk 18 is an optical disk or magnetic disk capable of recording and playing, with address information pre-formatted in the disk 18. In this example, a hard disk is used for the disk 18, and is built into the recorder/players 3 and 4.

The disk drive unit 14, under control of the control unit 10, rotates at a predetermined rotation speed, and rotationally drives the disk 18. The control unit 10 performs control so as to write information to the disk 18 from the writing processing unit 13, while confirming the recording position with the address read from the disk 18 by the address reading unit 15. The control unit 10 also writes management data such as the contents ID and writing position of the information written to the disk 18 to the read-in area of the disk 18, and further monitors available capacity of the disk 18.

The IEEE 1394 interface 11 obtains, of the data and control signals sent over the bus 1, those bound for its own device, and also outputs data and control signals bound for other devices. The control unit 10 recognizes information to be recorded by the contents ID contained in the data from the IEEE 1394 interface 11.

The compressed digital information obtained by the IEEE 1394 interface 11 is supplied to the writing processing unit 13 via the consecutive recording information adding unit 12, and is written to the disk 18.

At the time of this information writing, in the event that the control unit 10 judges that the available capacity of the disk 18 is low and that the contents being written cannot be recorded to the end, the control unit 10 generates consecutive recording information made up of information indicating which recorder/player the subsequent information of the contents ID will be consecutively recorded to, and adds this to the contents with the consecutive recording information adding unit 12. In this case, the consecutive recording information is added to the MPEG compressed data as added data. The consecutive recording information is used at the time of playing the information recorded in a dispersed state in a time-wise continuous manner.

Information of the recorder/player consecutively recording the contents is stored in the consecutive recorder information memory 17 beforehand. That is to say, the present embodiment is configured such that the user can use the key input operating unit 16 beforehand to specify the recorder/player (consecutive recorder) to continue executing recording following partway ending, for cases wherein the recording ends partway through due to insufficient available capacity in the recording medium being recorded upon.

With the present embodiment, the control unit 10 of the recorder/player according to the configuration shown in FIG. 3 recognizes all equipment connected to the bus 1 via the IEEE 1394 interface 11, and generates list information of the devices connected to the bus 1 based on this recognition, which is displayed on a display omitted in FIG. 3. Then, information of the consecutive recorder is stored in the memory 17 by the user selecting an appropriate consecutive recorder from the list of devices shown. The control unit 10 reads out the information of the consecutive recorder stored in the memory 17, and includes this in the consecutive recorder information.

Figure 2:
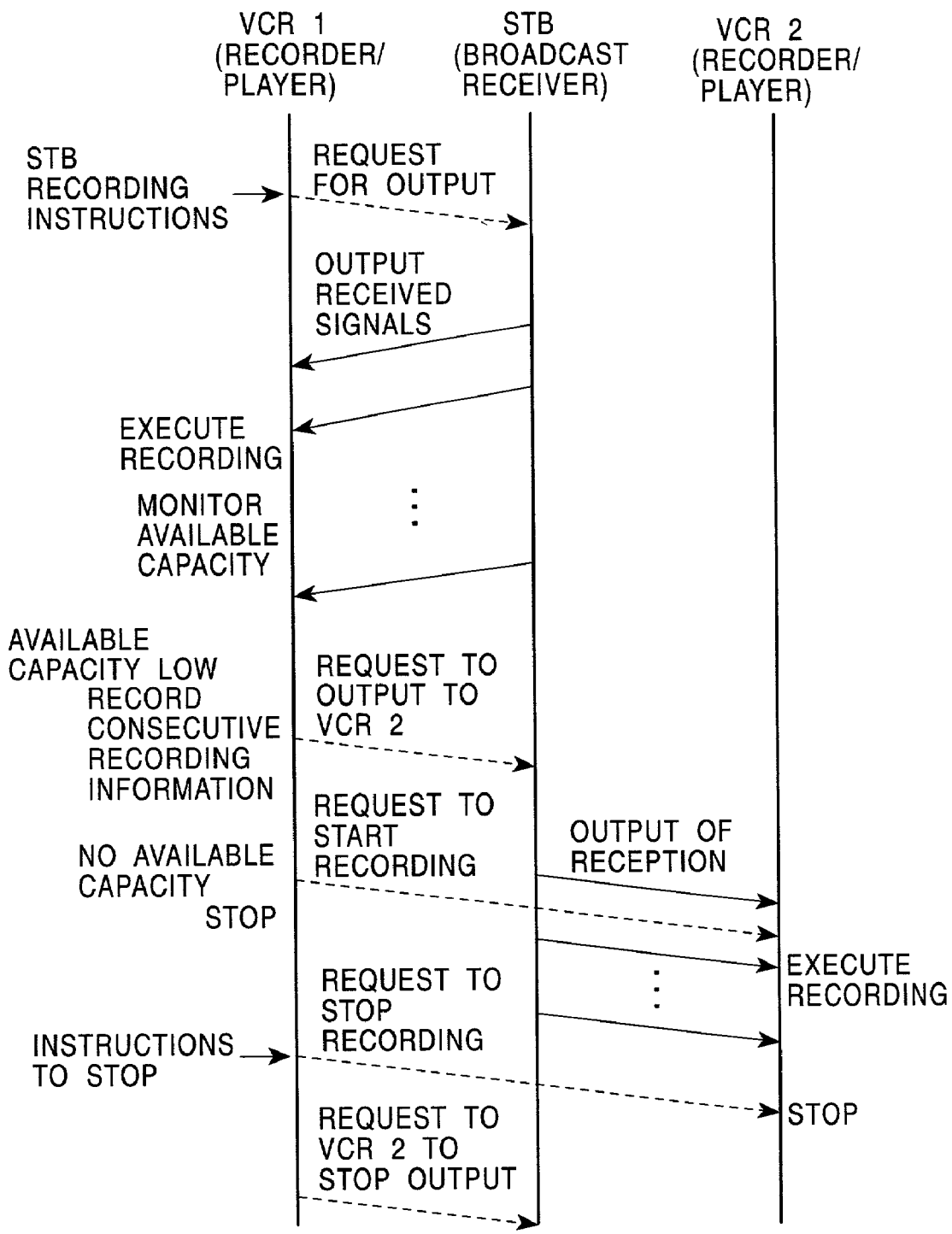
FIG. 2 is a sequence diagram for describing the operation of an embodiment of the information sending method according to the present invention.
Figure 4:
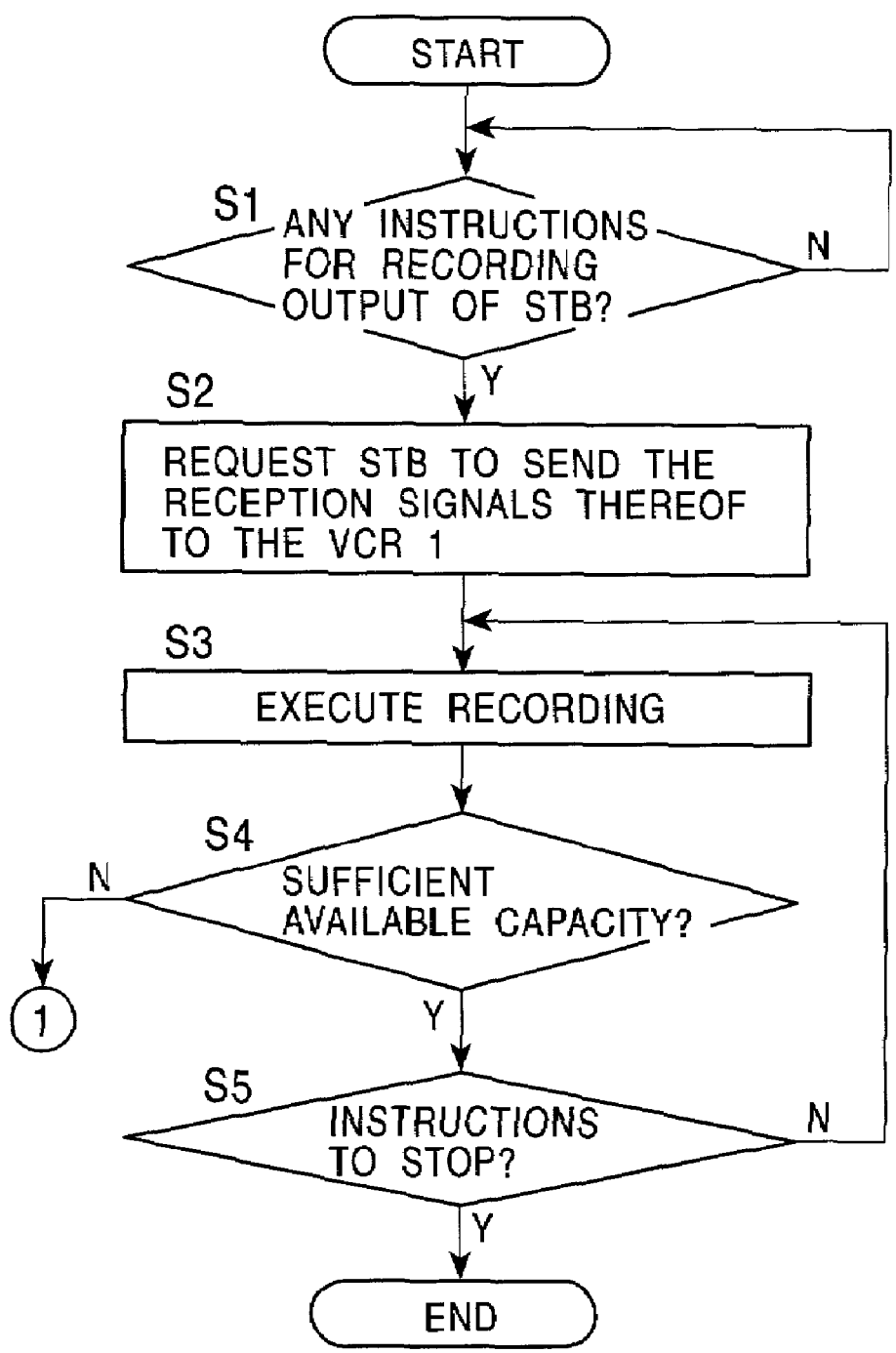
FIG. 4 is a diagram showing part of a flowchart for describing the operation of an embodiment of the information sending method according to the present invention.
Figure 5:
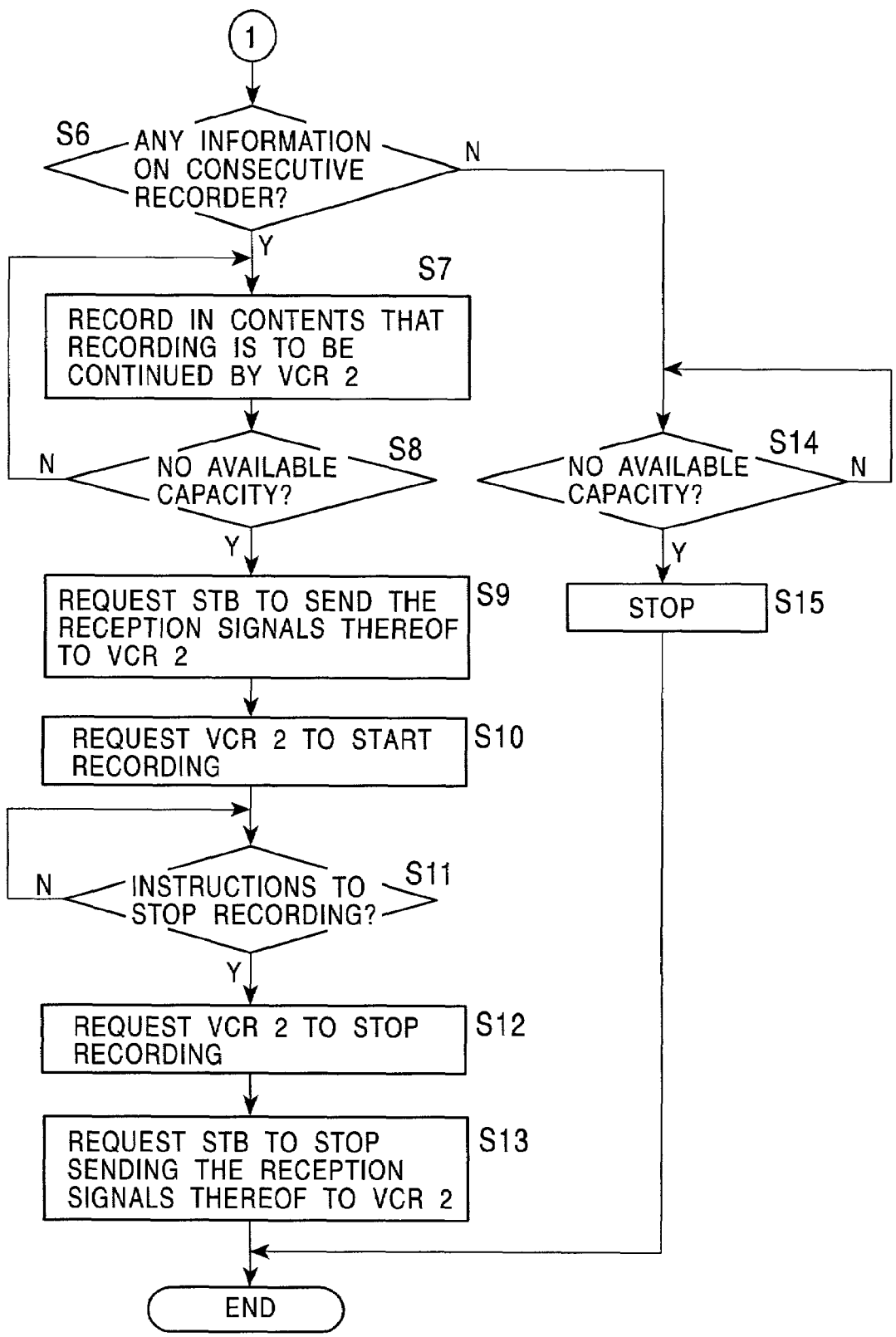
FIG. 5 is a diagram showing another part of a flowchart for describing the operation of an embodiment of the information sending method according to the present invention.

Next, description will be made regarding a case wherein the recorder/player 4 has been selected as the consecutive recorder in the memory 17, in an example situation wherein the recording capacity of the disk 18 has run out while recording a certain contents A with the recorder/player 3 so the contents A will be consecutively recorded by the recorder/player 4, with reference to the sequence diagram shown in FIG. 2, and the flowcharts shown in FIGS. 4 and 5.

With this embodiment, the recorder/player 3 performs control of the communication link via the IEEE 1394 bus 1. That is to say, the recorder/player 3 sends instructions regarding the output destination of the broadcast receiver 2 connected to the IEEE 1394 bus 1, recording instructions to the recorder/player 4 to perform consecutive recording, and like control signals, thereby controlling communication on the serial bus 1. In FIG. 1, the dotted lines indicate the flow of control signals, and the fine lines indicate the flow of information such as picture information or the like.

With this example, the user instructs recording of the contents A to be recorded to the recorder/player 3 while viewing the program received with the broadcast receiver 2 on the aforementioned television receiver. The recorder/player 3 distinguishes the recording instructions from the user in step S1 in FIG. 4. The recorder/player 3 then sends a request to the broadcast receiver 2 to send the compressed digital output to itself (step S2).

In response to this output request, the broadcast receiver 2 sends the compressed digital output out onto the bus 1, with the output destination as the recorder/player 3. The recorder/player 3 then receives the compressed digital output from the broadcast receiver 2, and writes this to the disk 18 as described above (step S3). At this time, the contents ID (identifier) of the contents A and the recording position a recorded on the disk 18, as described above.

Then, the recorder/player 3 monitors the available capacity of the disk 18 (step S4), and in the event that there is sufficient available capacity, judgment is made regarding whether or not there recording stop instructions have been given (step S5), and in the event that recording stop instructions have been given, the recording processing routine ends. In the event that recording stop instructions have not been given, the flow returns to step S3, and recording is continued.

Also, in the event that judgment is made in step S4 that there is not sufficient available capacity in the disk 18, reference is made to the consecutive recorder information memory 17 and judgement is made regarding whether or not information is stored in the memory 17 for a consecutive recorder (step S6). In the event that there is no information stored for a consecutive recorder, at the point that the available capacity of the disk 18 runs out (step S14) the recording is stopped (step S15), and the recording routine ends.

In the event that there is information stored in the consecutive recorder information memory 17 for a consecutive recorder, information to the effect that recording of the information will be continued by the recorder/player 4 is added to the contents A and recorded on the disk 18 (step S7). This adding and recording the consecutive recording information is repeated until judgment is made that the available capacity of the disk 18 is almost all gone (steps S8 and S7). The reason that the consecutive recording information is not only recorded at the end of the recording portion of the contents A in the disk 18 but also recorded immediately before that is in order to allow a smooth transition at the time of playing.

In the event that judgment is made that the available capacity of the disk 18 is almost all gone, the recorder/player 3 requests the broadcast receiver 2 to send the compressed digital output to the recorder/player 4 (step S9). Also, the recorder/player 3 sends a recording start request to the recorder/player 4 (step S10).

In the event that the user gives a recording stop request to the recorder/player 3 (step S11), the recorder/player 3 sends a recording stop request to the recorder/player 4 via the bus 1 (step S12), and further sends a request to the broadcast receiver 2 to stop sending the compressed digital output thereof to the recorder/player 4 (step S13). Thus, the recording processing routine ends.

In this way, according to the present embodiment, the user can record the contents A in a dispersed manner simply by giving recording instructions of the contents A to the recorder/player 3. Accordingly, the user can record contents without giving any particular consideration to the available capacity of the recording medium.

Also, adding and recording the consecutive recording information to the contents facilitates time-wise continuous recording of the contents recorded in a dispersed manner, as will be described later.

(Playing Method According to the First Embodiment)

Next, the method for playing the contents dispersed and recorded as described above, in a time-wise continuous manner.

Figure 6:
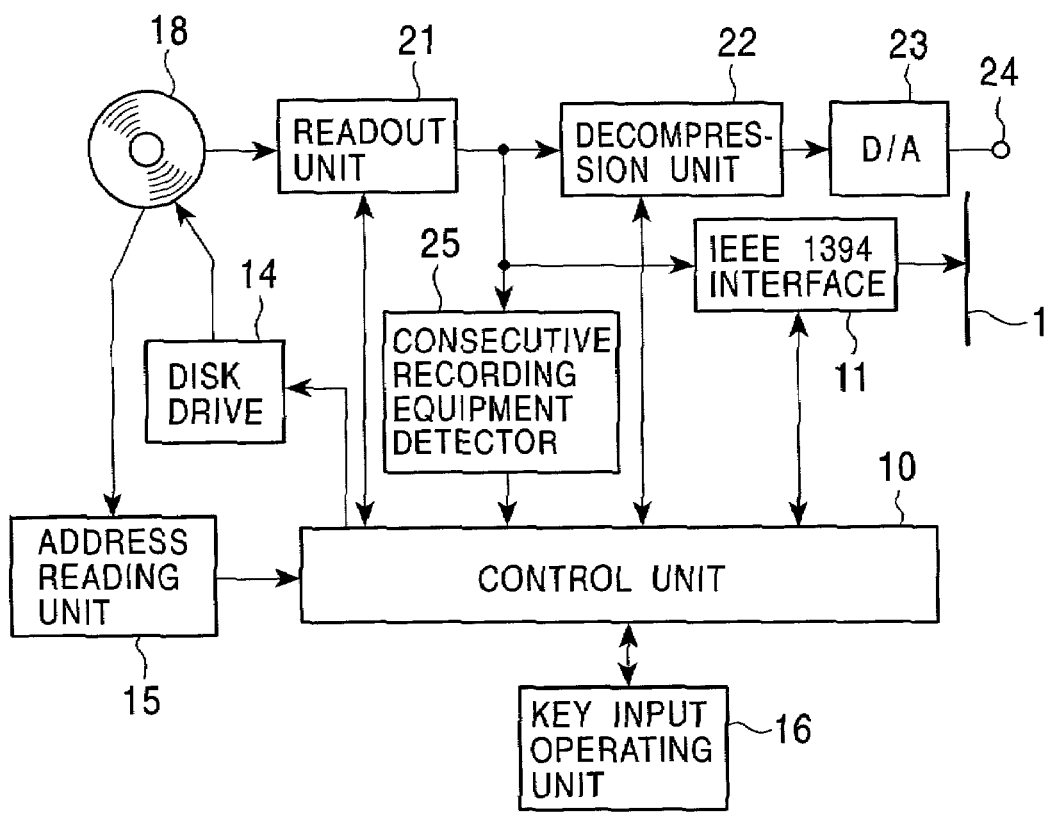
FIG. 6 is a block diagram illustrating the playing system of a recorder/player serving as an embodiment of an electronic information device according to the present invention.

FIG. 6 is a block diagram illustrating a configuration example of the playing system of a recorder/player 3 or 4, comprising a readout unit 21, a decompressing unit 22, and D/A converter 23, an analog output terminal 24, and a consecutive recorder detecting unit 25, and also comprises the control unit 10, IEEE 1394 interface 11, drive unit 14, address reading unit 15, and key input operating unit 16, shown in FIG. 3.

Following the playing instructions for the contents given via the key input operating unit 16, the control unit 10 searches the position where the contents are recorded based on the address information from the address reading unit 15, and causes the readout unit 21 to read out the contents. The compressed digital information read out by the readout unit 21 is decompressed by the decompressing unit 22, converted into analog signals by the A/D converter 23, and sent out from the analog output terminal 24.

Also, the compressed digital information from the readout unit 21 is supplied to the IEEE 1394 interface 11 as is, converted into a data format according to the IEEE 1394 bus standards, and is sent out onto the bus 1.

Also, the compressed digital information is supplied to the consecutive recorder detecting unit 25, and information indicating the consecutive recorder is detected from the consecutive recorder information contained in the MPEG compressed data. The consecutive recorder detecting unit 25 transfers the detection results thereof to the control unit 10.

FIG. 7 illustrates a configuration example of the display 5. In this example, the display 5 comprises an analog input terminal 31, a selector 32, an IEEE 1394 interface 33, a decompressing unit 34, a D/A converter 35, a display unit 36, a control unit 30, and a key input operating unit 37.

In the event that the analog input terminal 31 has been selected by the key input operating unit 37, the selector 32 supplies picture information input via the analog input terminal 31 to the display unit 36, and thus displays pictures thereof on the screen of a display device such as a CRT (Cathode Ray Tube) or an LCD (Liquid Crystal Display).

Also, in the event that digital input has been selected by the key input operating unit 37, the selector 32 selects picture information from the D/A converter 35. In this case, the IEEE 1394 interface 33 takes in digital data bound for itself (including cases wherein the output destination (where the information is bound) is all devices), and sends this to the decompressing unit 34. The decompressing unit 34 expands and decompresses the compressed digital data, and sends this to the D/A converter 35. Accordingly, the pictures of the digital data obtained from the bus 1 are displayed on the screen of the display device of the display unit 36.

The following is a description of consecutively supplying the contents dispersed and recorded in the recorder/players 3 and 4 as described above to the display 5 so as to play the pictures, with the recorder/players 3 and 4 and display 5 configured as described above, with reference to FIGS. 8 through 10.

In the case of this embodiment, as with the time of recording, the recorder/player 3 performs control of the communication link via the IEEE 1394 bus 1. That is to say, the recorder/player 3 not only performs communication link generating control with itself and the display 5, but also performs communication link generating control between the recorder/player 4 and the display 5. In FIG. 8, the dotted lines indicate the flow of control signals, and the fine lines indicate the flow of information such as picture information or the like.

Figure 10:
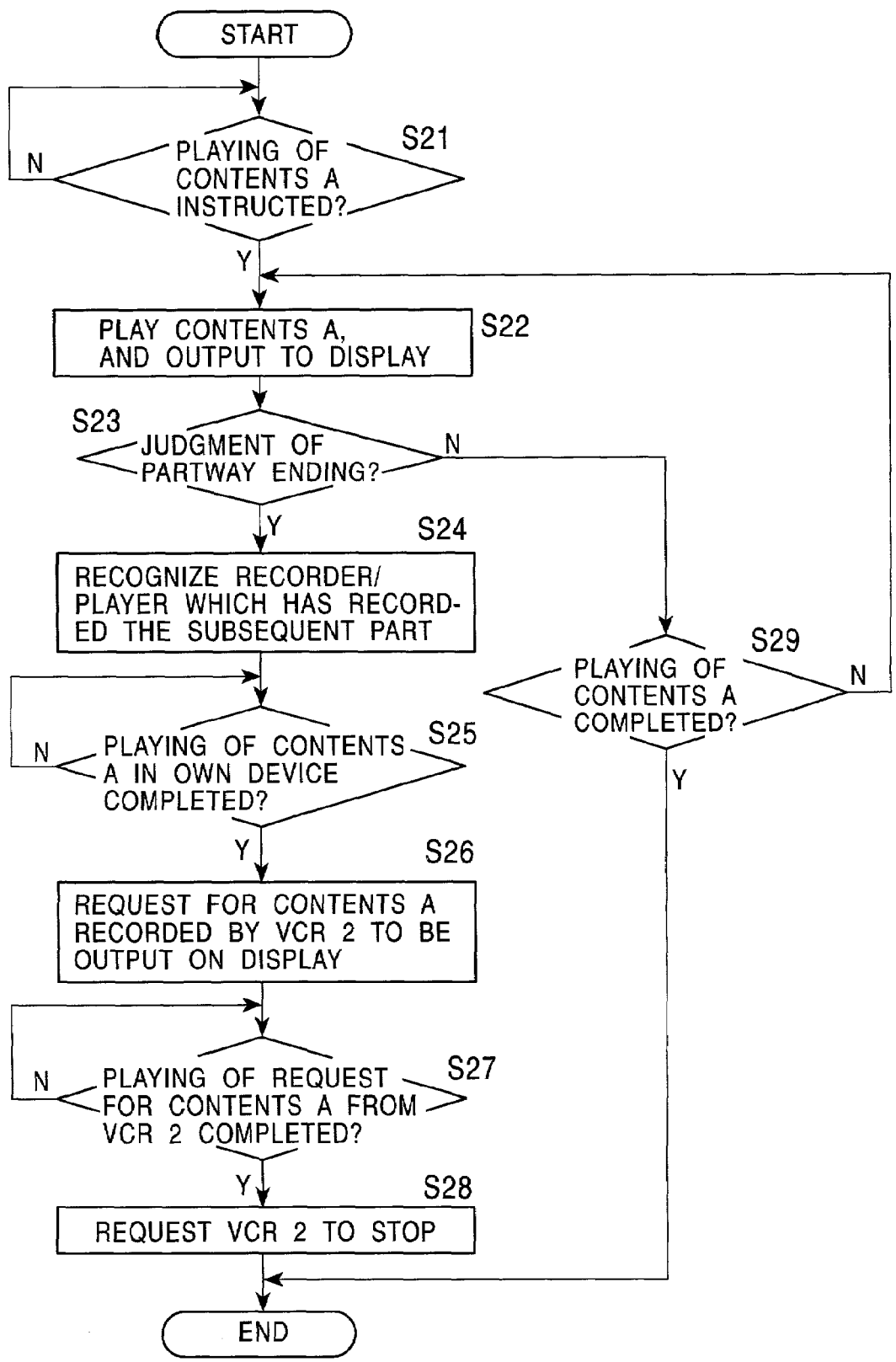
FIG. 10 is a flowchart for describing the operation of an embodiment of the information sending method according to the present invention.

Next, the consecutive playing operation of the contents A dispersed and recorded according to the present embodiment will be described with reference to the sequence diagram shown in FIG. 9 and the flowchart shown in FIG. 10.

First, at the recorder/player 3, at the point that playing instructions of the contents A are received from the user via the key input operating unit 16 (step S21 in FIG. 10), the at the recorder/player 3 generates a communication link to the display 5, plays the contents A, and outputs the played contents A to the display 5 via the bus 1 (step S22).

As described above, the display 5 receives the played output of the contents A with the IEEE 1394 interface 33, decompresses the compression, and displays the pictures thereof on the screen of the display unit 36. Then, the recorder/player 3 judges whether or not the playing of the contents A will end partway through, by monitoring the consecutive recording information added to the contents A and thus recorded (step S23).

In the event that no consecutive recording information is detected in step S23, and judgment is made that the information will not end partway through, judgment is made whether or not the user has given playing ending instructions (step S29), and in the event that judgment is made that playing ending instructions have been given, the playing processing routine ends. Also, in the event that judgment is made that playing ending instructions have not been given, the flow returns to step S22, and playing processing continues.

In the event that judgment is made in step S23 that consecutive recording information has been detected from the contents A, the device wherein the continuation of the contents A is situated is recognized from the consecutive recording information (step S24). In the case of this example, recognition is made that the consecutive recording device is the recorder/player 4.

Next, the recorder/player 3 waits for the contents A in itself to end playing (end partway through) (step S25), and requests the recorder/player 4 to output the contents A recorded therein to the display 5 (step S26).

The recorder/player 4 receives this request via the IEEE 1394 interface, plays the contents A, and outputs this to the display 5. The recorder/player 3 monitors the existence of information of the contents A from the recorder/player 4, and at the point that there is no more flow of the contents A on the bus 1, the recorder/player 3 judges that the recorder/player 4 has finished playing the contents A (step S27). Then, the recorder/player 3 outputs a playing stopping request to the recorder/player 4, based on the detection of ending of playing of the contents A from the recorder/player 4 (step S28). Upon receiving this, the recorder/player 4 stops playing.

Thus, the consecutive playing of the contents A dispersed and recorded in the recorder/players 3 and 4 ends.

As described above, the user can view and listen to the played outputs of the contents A recorded in both the recorder/players 3 and 4 in an almost-continuous manner time-wise, simply by giving playing instructions to the recorder/player 3 for the contents A.

(Second Embodiment of Dispersing Method and Playing Method Thereof)

(Dispersing and Recording Method According to Second Embodiment)

With the above first embodiment, information indicating the recorder/player to continue recording was contained and recorded in the contents recorded in the recording medium, but with the second embodiment, information of the dispersed storage location of the contents dispersed and recorded is recorded in and managed by one of the electronic information devices connected to the bus. This information of the dispersed storage location is also information regarding the dispersed storage devices.

An example of the dispersed storage location information stored here is shown in FIG. 11. That is to say, the dispersed storage location information is information of the storage location for each contents ID ("ID" meaning "identifier"), and the information of the storage location includes information indicating one or multiple recorder/players, and in the event that there are multiple recorder/players, the information also includes information indicating the order thereof.

The dispersed storage location information is used for playing the information recorded in a dispersed state in a time-wise continuous manner, and the contents recorded in a dispersed state are played by the electronic information equipment storing the dispersed storage location information.

The dispersed storage location information may be stored in electronic information equipment connected to the bus 1 and taking part in the recording processing, or may be stored in other electronic information equipment connected to the bus 1, such as a personal computer 6.

(Playing Method According to the Second Embodiment)

Figure 12:
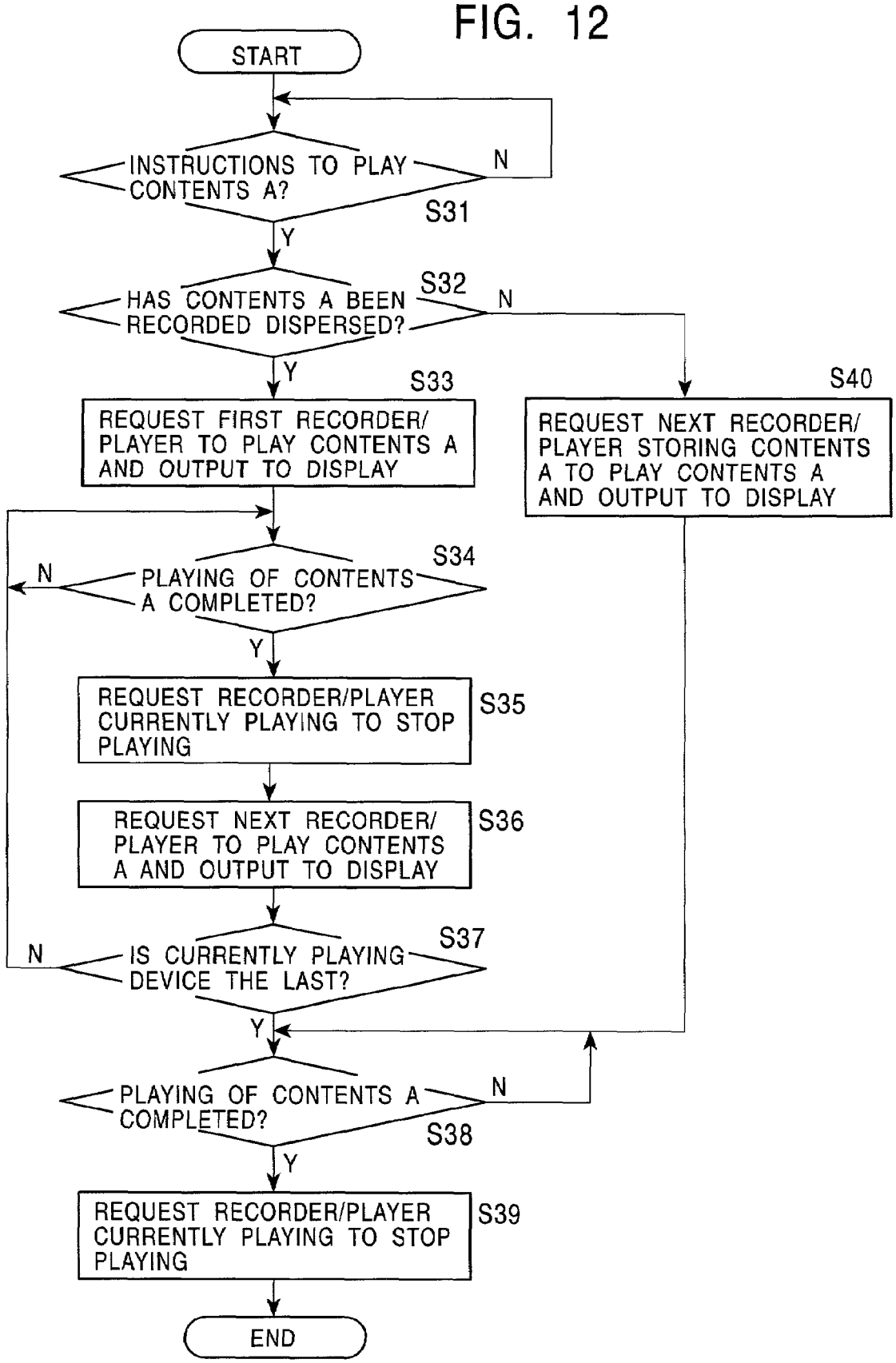
FIG. 12 is a flowchart for describing the operation of an embodiment of the information sending method according to the present invention.

FIG. 12 is a flowchart illustrating the processing steps performed at the personal computer 6 in a case wherein the dispersed storage location information is stored in and managed by the personal computer 6 and wherein the contents A dispersed and stored in the recorder/players 3 and 4 is to be consecutively played as described above.

In this case, the user gives playing instructions for the contents A to the personal computer 6. Upon detecting the playing instructions for the contents A by the user (step S31), the personal computer 6 makes reference to the dispersed storage location information, and judges whether or not the contents A has been dispersed and recorded in multiple recorder/players (step S32).

In the event that the contents A have not been dispersed, a request is given to the recorder/player where the contents A are stored, to play the contents A and output to the display 5 (step S40). The recorder/player which has received this request plays the contents A, and outputs via the bus 1 to the display 5.

The personal computer 6 monitors the contents A on the bus 1 by the contents ID contained in the information being sent, and at the point that no contents ID can be detected in the information on the bus 1 judges that the contents A have finished playing (step S38), and sends a playing stop request to the recorder/player that is currently playing (step S39). The recorder/player currently playing receives this request, stops the playing, and also stops output to the bus 1.

In the event that judgement is made in step S32 that the contents A are recorded in a dispersed manner, reference is made to the dispersed recording location information, and a request is made to the first recorder/player of the multiple recorder/players where the contents A are recorded, to play and output the contents A to the display 5 (step S33). The requested recorder/player plays the contents A, and outputs to the display 5 via the bus 1.

The personal computer 6 monitors the contents A on the bus 1, and at the point that the contents Id cannot be detected from the information on the bus 1, judges that the playing of the contents A has ended (step S34), and sends a playing stop request to the recorder/player current playing (step S35). The recorder/player current playing receives this request, stops the playing, and also stops playing output to the bus 1.

Next, the personal computer 6 makes reference to the dispersed storage location information, and gives a request to the next of the multiple recorder/players storing the contents A, to output to the display 5 (step S36). The recorder/player which has received this request plays the contents A, and outputs to the display 5 via the bus 1.

Then, the personal computer 6 makes reference to the dispersed storage location information and judges whether or not the recorder/player that is currently playing is the last of the multiple recorder/players storing the contents A (step S37), and in the event that this is not the last, the flow returns to step S34, and repeats the processing from this step S34 again. In the event that this is the last, ending of playing of the contents A at the recorder/player that is currently playing is judged in the same manner as with the above-described arrangement (step S38), and upon confirmation of completion of playing, a play stop request is sent to the recorder/player currently playing (step S39). The recorder/player that is currently playing receives this request, stops the playing, and also stops output to the bus 1.

According to the above processing, the contents A dispersed and recorded can be played in an almost-continuous manner time-wise.

Now, the above description involved the ending of playing of the contents A at each of the recorder/players to be detected by monitoring the contents ID of the contents being sent over the bus 1, but the switching over between the recorder/players which are playing can be made to be smoother by recording information in the contents A to the effect that the recording is continued, as with the above-described embodiment. The reason is that the timing for ending playing of the contents at the recorder/player can be recognized beforehand, and accordingly switching can be performed at the timing of ending playing. However, in this case, only information indicating whether recording of the contents A continues or stops needs to be added to the contents, and there is no need to add information of the consecutive recorder, so the amount of added information is reduced.

Incidentally, as described above, the electronic information equipment storing and managing the dispersed storage location information and managing communication need not be a personal computer as in the above example; rather, any of the recorder/players can execute the playing processing in the same manner as described above.

(Other Embodiments of Information Sending Control on the Network)

This embodiment is an arrangement used in a case such as consecutively changing the output destination of information output equipment such as a broadcast receiver connected to the IEEE 1394 bus 1. An example of such information sending is a case wherein a broadcast receiver for example supplies the received information thereof to the display such that picture display and audio playing for the user to view and listen to is taken and the reception information thereof is consecutively recorded by a recorder/player.

For example, let us say that a user has to suddenly leave viewing a program for a while. This arrangement allows the information following the interruption to be recorded in the recorder/player, which is useful for the user. Hereafter, such recording will be referred to as "intermission recording".

Figure 13:
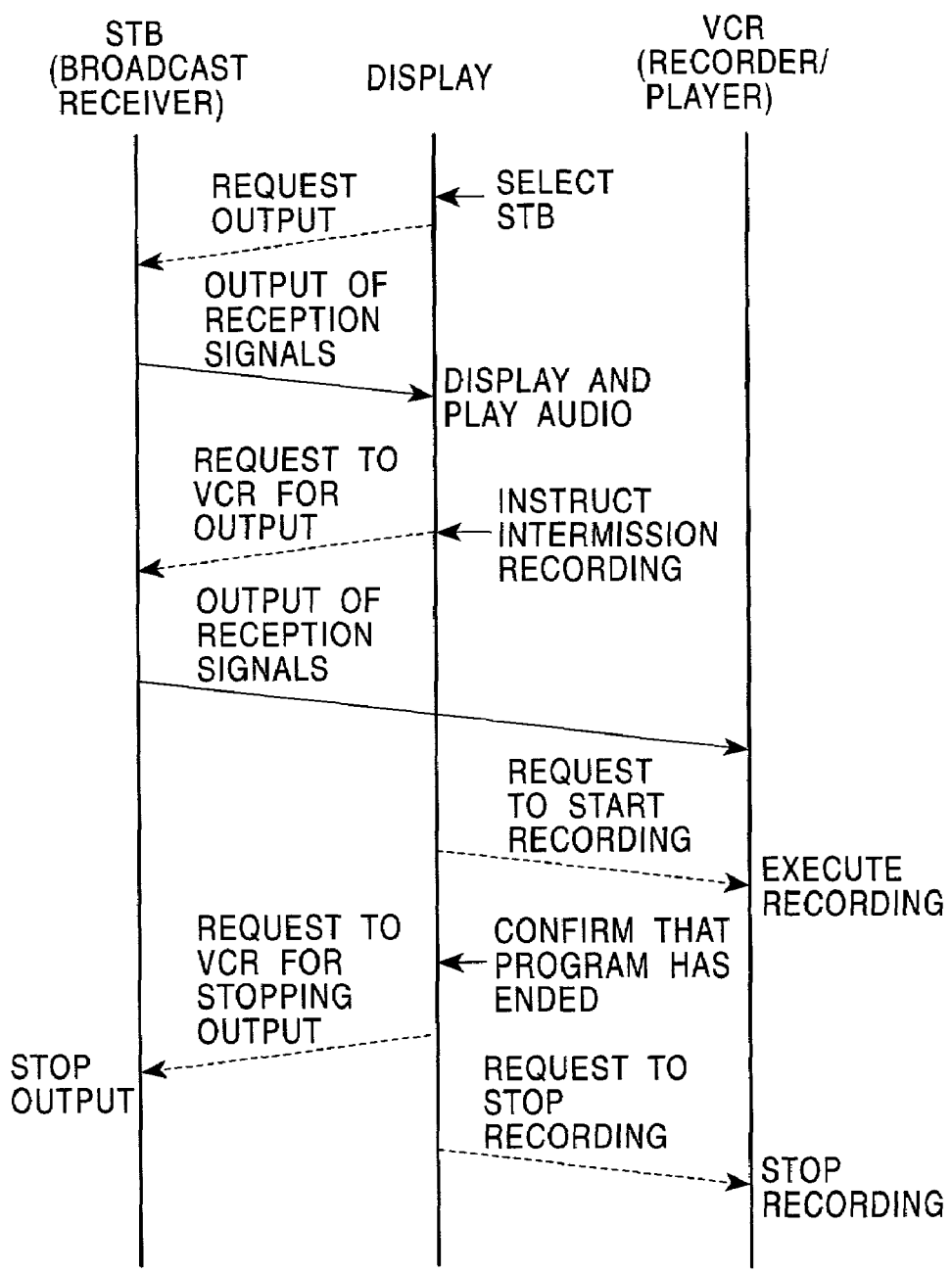
FIG. 13 is a sequence diagram for describing the operation of an embodiment of the information sending method according to the present invention.
Figure 14:
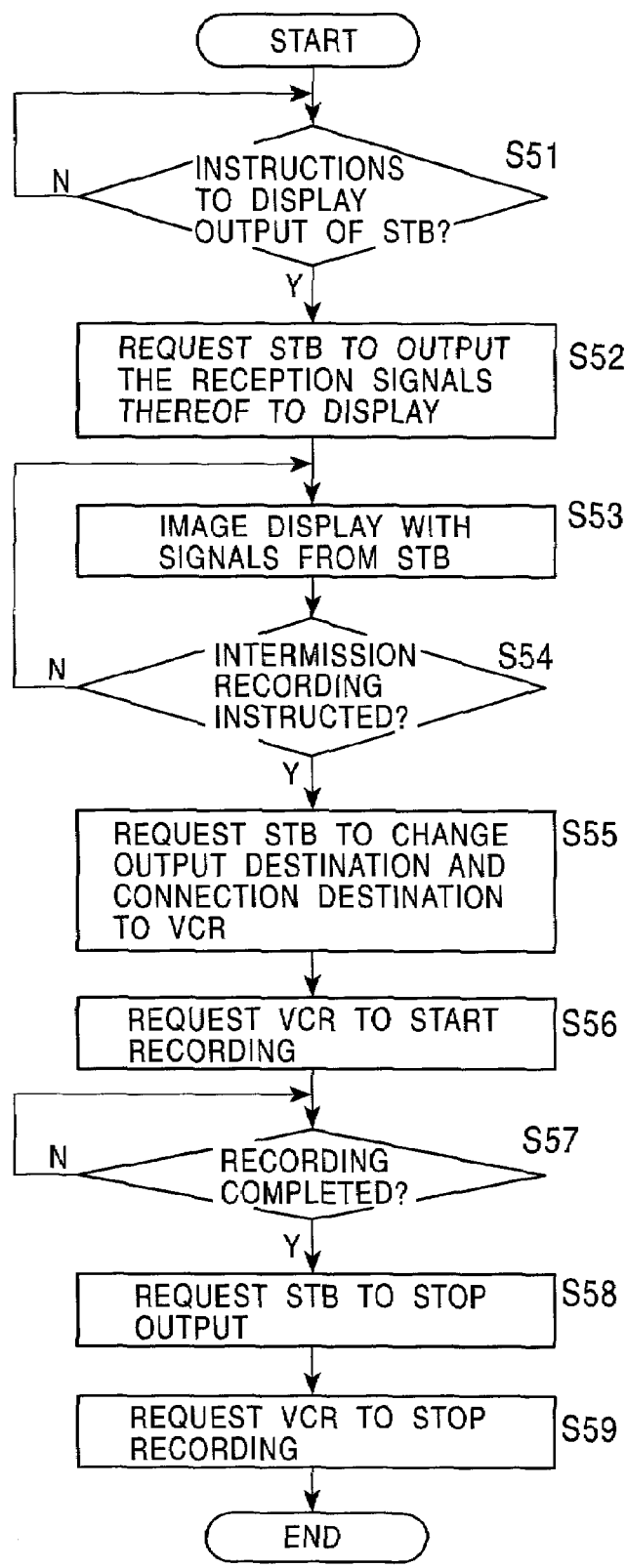
FIG. 14 is a flowchart for describing the operation of an embodiment of the information sending method according to the present invention.

FIGS. 13 and 14 are a sequence diagram and flowchart, respectively, for describing the operation of intermission recording according to this embodiment. As shown in FIG. 13, the display 5 manages the communication link on the bus and information sending in its entirety. In the case of this example, the configuration of the display 5 is almost the same as that shown in FIG. 7, with an intermission recording key included in the key input operating unit 37.

First, at the point that a viewing request for the contents of a broadcast program selected by the user is given via the key input operating unit 37 of the display 5 (step S51), the display 5 sends an output request to the broadcast receiver 2 for output of the broadcast program to itself (step S52). In response, the broadcast receiver 2 selects the specified receiver, and outputs the reception output of the broadcast program to the display 5. A program ID (identifier) is contained in the reception output of this broadcast program.

The display 5 receives the broadcast program information from the broadcast receiver 2 via the IEEE 1394 interface 33, decompresses the compression, displays pictures on the display screen and plays the audio (step S53).

Next, the display 5 judges whether or not the intermission recording key has been operated (step S54), and in the event that judgment is made that the intermission recording key has not been operated, the flow returns to step S53, and picture display and audio playing of the program information continues.

In the event that judgment is made in step S54 that the intermission recording key has been operated, the display 5 requests the broadcast receiver 2 to change the output destination of the reception output and the connection destination of the communication link from the display 5 to the recorder/player 3 (or recorder/player 4) (step S55). Then, the display 5 requests the recorder/player 3 (or recorder/player 4) to start recording (step S56). Due to this request, the recorder/player 3 (or recorder/player 4) starts recording the reception output from the broadcast receiver 2.

In this state, the display 5 monitors the program ID contained in the reception output of the broadcast program sent over the bus 1, and upon detecting the end of the program (step S57), the display 5 requests the broadcast receiver 2 to stop output of the reception output to the recorder/player 3 (or recorder/player 4) (step S58). Further, the display 5 requests the recorder/player 3 (or recorder/player 4) to stop recording (step S59). Thus, the intermission recording is completed.

As described above, the remainder of the program which the user had been watching can be recorded to the recorder/player 3 or 4 simply by operating the intermission recording key provided on the display 5, without any need to perform recording start operations for the recorder/player or switchover operations.

Figure 15:
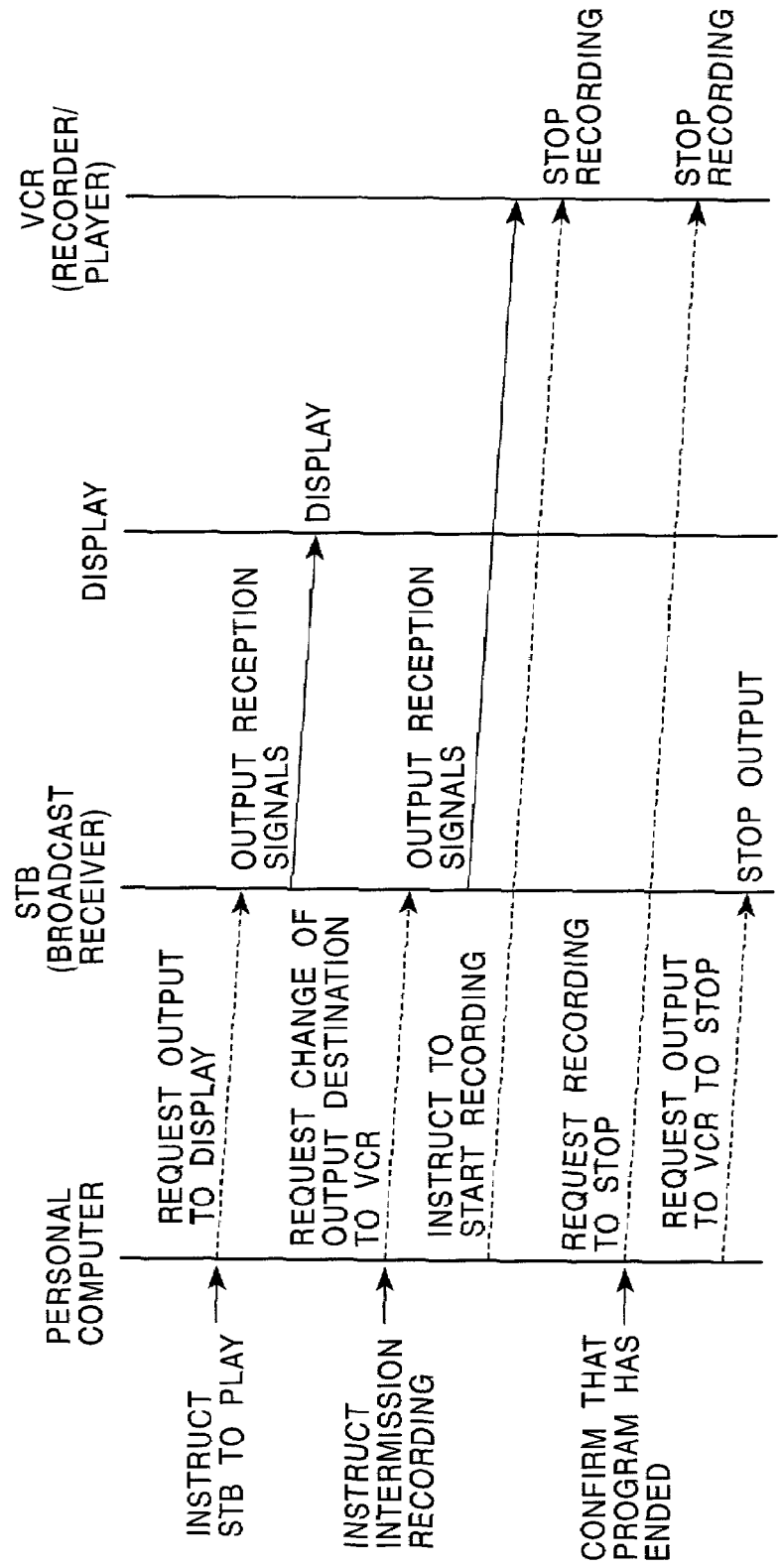
FIG. 15 is a sequence diagram for describing the operation of an embodiment of the information sending method according to the present invention.

Incidentally, the above description was made with the display 5 performing communication management, but this may be carried out by a personal computer 6. The sequence diagram for such an arrangement is shown in FIG. 15.

First, at the point that a request for viewing contents of a broadcast program selected by the user is made by input of instructions at the personal computer 6, the personal computer 6 gives a request to the broadcast receiver 2 to send the broadcast program thereof to the display 5. The broadcast receiver 2 responds by selecting the specified program and sending the reception output thereof to the display 5. The reception output of the broadcast program contains a program ID (identifier).

The display 5 receives the broadcast program information from the broadcast receiver 2 via the IEEE 1394 interface 33, decompresses the compression, and displays pictures on the display screen, and plays the audio.

Next, the personal computer 6 judges whether or not intermission recording has been instructed. In the event that judgment is made that intermission recording has been instructed, the personal computer 6 requests the broadcast receiver 2 to change the output destination of the reception output and the connection destination of the communication link from the display 5 to the recorder/player 3 (or recorder/player 4). Then, the personal computer 6 requests the recorder/player 3 (or recorder/player 4) to start recording. Due to this request, the recorder/player 3 (or recorder/player 4) starts recording the reception output from the broadcast receiver 2.

In this state, the personal computer 6 monitors the program ID contained in the reception output of the broadcast program sent over the bus 1, and upon detecting the end of the program, the personal computer 6 requests the broadcast receiver 2 to stop output of the reception output to the recorder/player 3 (or recorder/player 4). Further, the personal computer 6 requests the recorder/player 3 (or recorder/player 4) to stop recording. Thus, the intermission recording is completed.

(Other Variations)

Though the above embodiments have been described with reference to cases wherein the information being sent is picture information and audio information, it is needless to say that information sent over a network is by no means restricted to such information. Also, the above embodiments have been described with reference to cases wherein the picture information and audio information are sent over the network in a compressed state, but the present invention is by no means restricted to compressed information.

Further, though the above embodiments have been described using an IEEE 1394 serial bus for a network, but the present invention is by no means restricted to this; rather, the present invention can be applied to other networks such as TCP/IP (transmission Control Protocol/Internet Protocol) and ATM (Asynchronous Transfer Mode) networks in an equally suitable manner.

What is claimed is:

1. A method for sending information over a network wherein information is dispersed and stored in a plurality of pieces of electronic information equipment connected to said network and wherein said information stored in a dispersed state is managed by one of said pieces of electronic information equipment connected to said network;

wherein each of said pieces of electronic information equipment comprises means for forming a communication channel with another piece of electronic information equipment instructed by output instructions received thereby as an interface to said network;

and wherein, in the event of inputting said information stored in a dispersed state to said one of said pieces of electronic information equipment on said network as a time-wise continuous piece of information, said electronic information equipment managing said information stored in a dispersed state gives, based on managing information thereof, output instructions to each of said pieces of electronic information equipment to output the information dispersed and stored in each of said pieces of electronic information equipment to an output destination electronic information equipment, and upon detection of completion of information output from one of said pieces of electronic information equipment, gives output instructions to the electronic information equipment storing subsequent information to output the information stored therein to said output destination electronic information equipment, wherein an identification of the electronic information equipment storing the subsequent information is stored with the information;

and wherein each of said pieces of electronic information equipment storing said information in a dispersed state output information to said network with the output destination of said information as said output destination electronic information equipment, based on said output instructions.

2. A method for sending information over a network according to claim 1, wherein said electronic information equipment for managing information of said dispersed storage state is one of the pieces of electronic information equipment whereby information is dispersed and stored.

3. A method for sending information over a network according to claim 1, wherein said electronic information equipment for managing information of said dispersed storage state is a piece of electronic information equipment other than the pieces of electronic information equipment whereby information is dispersed and stored.

4. A method for sending information over a network according to claim 1, wherein said information stored in a dispersed state is at least one of picture information and audio information, and wherein said output destination electronic information equipment comprises at least one of display output means for said picture information and acoustic output means for said audio information.

5. A method for sending information over a network; wherein information is dispersed and stored in a plurality of pieces of electronic information equipment connected to said network and also the information stored in each of said pieces of electronic information equipment contains storing equipment information regarding which of the pieces of electronic information equipment on the network is storing the subsequent information portion;

and wherein each of said pieces of electronic information equipment comprises means for forming a communication channel with another piece of electronic information equipment instructed by output instructions received thereby as an interface to said network;

and wherein, in the event of inputting said information stored in a dispersed state to said one of said pieces of electronic information equipment on said network as a time-wise continuous piece of information, said plurality of pieces of electronic information equipment storing said information in a dispersed state sequentially output the information stored in each of said pieces of electronic information equipment to the output destination electronic information equipment via said network;

and wherein one of said pieces of electronic information equipment on said network monitors information flowing on said network, and upon detection of said storing equipment information, gives output instructions to the electronic information equipment instructed by said storing equipment information to output the information stored therein to said output destination electronic information equipment.

6. A method for sending information over a network according to claim 5, wherein said electronic information equipment for monitoring information flowing on said network is one of the pieces of electronic information equipment whereby information is dispersed and stored.

7. A method for sending information over a network according to claim 5, wherein said electronic information equipment for monitoring information flowing on said network is a piece of electronic information equipment other than the pieces of electronic information equipment whereby information is dispersed and stored, and is a piece of electronic information equipment which has given output instructions to a piece of electronic information equipment storing information containing the first part of said information.

8. A method for sending information over a network according to claim 5, wherein said information stored in a dispersed state is at least one of picture information and audio information, and wherein said output destination electronic information equipment comprises at least one of display output means for said picture information and acoustic output means for said audio information.

9. A method for sending information over a network; wherein a plurality of pieces of electronic information equipment are connected to a network, with a communication channel being formed via said network between two pieces of electronic information equipment of said plurality of pieces of electronic information equipment and the output information of one piece of electronic information equipment of said two pieces of electronic information equipment being input to the other piece of electronic information equipment, thereby performing information recording at said other piece of electronic information equipment;

and wherein a piece of electronic information equipment connected to said network gives instructions to said other piece of electronic information equipment of said two pieces of electronic information equipment to change the output destination of said output information to a piece of electronic information equipment other than said other piece of electronic information equipment and to store an indication of the output destination electronic information equipment after said output destination is changed with said information, and also instructs said other piece of electronic information equipment to start recording information input thereto.

10. A method for sending information over a network according to claim 9, wherein said piece of electronic information equipment which gives said output destination changing instructions and information processing starting instructions is said one piece of electronic information equipment of said two pieces of electronic information equipment, which outputs output information.

11. A method for sending information over a network according to claim 9, wherein said piece of electronic information equipment which gives said output destination changing instructions and information processing starting instructions is a piece of electronic information equipment other than said two pieces of electronic information equipment.

12. A method for sending information over a network according to claim 9, wherein said piece of electronic information equipment which gives said output destination changing instructions and information processing starting instructions is said output destination electronic information equipment before said output destination is changed.

13. A method for sending information over a network according to claim 9, wherein said sent information is at least one of picture information and audio information;
and wherein information processing in the output destination electronic information equipment before said output destination is changed comprises at least one of display output processing for said picture information and acoustic output processing for said audio information;
and wherein information processing in output destination electronic information equipment after said output destination is changed is processing for storing said at least one of picture information and audio information in a recording medium.

14. A method for sending information over a network according to claim 13, wherein said piece of electronic information equipment which gives said output destination changing instructions and information processing starting instructions, gives said output destination changing instructions and information processing starting instructions based on user instructions via instruction input means.

15. A method for sending information over a network according to claim 9, wherein information signals processing in both said pieces of output destination output destination electronic information equipment before and after said output destination is changed is processing for storing information signals in a recording medium;
and wherein output destination changing instructions and information processing starting instructions are given in the event that the available capacity of said recording medium of said electronic information equipment before said output destination is changed becomes insufficient.

16. A method for sending information over a network according to claim 9, wherein information signals processing in both said pieces of output destination output destination electronic information equipment before and after said output destination is changed is processing for storing information signals in a recording medium;
and wherein said piece of electronic information equipment which gives said output destination changing instructions and information processing starting instructions is said output destination electronic information equipment before said output destination is changed, for giving said output destination changing instructions and information processing starting instructions in the event that the available capacity of said output destination electronic information equipment before said output destination is changed becomes insufficient, and also recording information of the output destination output destination electronic information equipment after said output destination is changed, in said recording medium.

17. Electronic information equipment, comprising:
interface means for connecting to a network;
an information signal storing unit;
means for reading information out of said storing unit according to output instructions, sending said information out onto said network via said interface means, and transmitting said information to output destination electronic information equipment which is the target of the transaction; and
means for, in the event that successive information has been detected at the point of ending reading of said information from said storing unit, giving output instructions to electronic information equipment storing said successive information to output said successive information to said output destination electronic information equipment. wherein an identification of the electronic information equipment storing the successive information is stored with the information.

18. Electronic information equipment, comprising:
interface means for connecting to a network;
recording means for recording information signals transmitted from information output equipment via said network in a recording medium; and
means for, in the event of judging that the available capacity of said recording medium is insufficient while recording with said recording means, requesting output of said information signals to other electronic information equipment having functions for recording information signals, and also
requesting said other electronic information equipment to execute recording, wherein the recording means further records on said recording medium an indication of the other electronic information equipment along with said recorded information signals.

* * * * *